(12) United States Patent
Cotner (10) Patent No.: US 8,960,693 B1
(45) Date of Patent: Feb. 24, 2015

(54) DOOR TRANSPORTING AND POSITIONING SYSTEM

(71) Applicant: Stuart Cotner, Albuquerque, NM (US)

(72) Inventor: Stuart Cotner, Albuquerque, NM (US)

( * ) Notice: Subject to any disclaimer, the term of this patent is extended or adjusted under 35 U.S.C. 154(b) by 268 days.

(21) Appl. No.: 13/670,152

(22) Filed: Nov. 6, 2012

Related U.S. Application Data (60) Provisional application No. 61/562,900, filed on Nov. 22, 2011.

(51) Int. Cl.
*B62B 1/14* (2006.01)
*B62B 1/26* (2006.01)
*B62B 1/06* (2006.01)

(52) U.S. Cl.
CPC ........................................ *B62B 1/06* (2013.01)
USPC .................... 280/79.7; 280/63; 280/47.131

(58) Field of Classification Search
USPC ............ 280/79.11, 79.7, 47.131, 47.34, 43.1, 280/47.11, 47.19, 63; 414/11, 444
See application file for complete search history.

(56) References Cited

U.S. PATENT DOCUMENTS

| | | | | |
|---|---|---|---|---|
| 897,853 A | * | 9/1908 | Vom Scheidt | 410/51 |
| 1,330,891 A | * | 2/1920 | Harrington | 280/47.34 |
| 3,580,601 A | * | 5/1971 | Miles | 280/47.131 |
| 3,698,577 A | * | 10/1972 | Dean | 414/343 |
| 4,270,741 A | * | 6/1981 | Hurst | 269/17 |
| 5,158,312 A | * | 10/1992 | Lausch | 280/79.7 |
| 5,232,233 A | * | 8/1993 | Jedora | 280/47.331 |
| 5,284,410 A | * | 2/1994 | Sare et al. | 414/11 |
| 5,927,731 A | * | 7/1999 | Clarke | 280/79.7 |
| 6,592,134 B2 | * | 7/2003 | Abraham | 280/79.7 |
| 6,663,123 B1 | * | 12/2003 | Kovacs | 280/79.7 |
| 6,955,368 B2 | * | 10/2005 | Bakhoum | 280/79.3 |
| 8,100,419 B2 | * | 1/2012 | Morisset | 280/79.7 |
| 8,162,329 B1 | * | 4/2012 | Openshaw | 280/47.131 |

* cited by examiner

Primary Examiner — J. Allen Shriver, II
Assistant Examiner — Bridget Avery (57) ABSTRACT

A door transporting and positioning system for enabling a single user to safely transport or position a door for installation has a door cradle to hold a door. A cradle floor has a general shape of a "U". The door cradle has a generally planar first side surface interface component, second side surface interface component, and a floor surface interface component each constructed from compressible, non-marring material. The system has a clamping device located close to a cradle anterior end on a cradle bottom with a spanning bar. A spanning bar first end has a first side clamping member and a spanning bar second end has a second side clamping member. The system has a first axle perpendicularly located on the cradle first side with a first wheel, and a second axle perpendicularly located on the cradle second side with a second wheel.

5 Claims, 6 Drawing Sheets

DOOR TRANSPORTING AND POSITIONING SYSTEM

CROSS REFERENCE

This application claims priority to U.S. provisional application Ser. No. 61/562,900 filed Nov. 22, 2011, the specification of which is incorporated herein by reference in its entirety.

BACKGROUND OF THE INVENTION

The installation and removal of a door can be a cumbersome operation due to the size and weight of the door. It can be relatively heavy for a single person to manipulate, requiring both hands to lift, carry, or hold into position. This can be especially challenging when the person attempts to position the door during installation or removal while simultaneously installing or removing the screws or the pins in the hinges. The present invention features a door transporting and positioning system for enabling a single user to safely transport or position a door for installation or removal.

SUMMARY

The present invention features a door transporting and positioning system for enabling a single user to safely transport or position a door for installation or removal. In some embodiments, the system comprises a door. In some embodiments, the system comprises a door cradle. In some embodiments, a cradle floor comprises a general shape of a "U".

In some embodiments, the door cradle comprises a generally planar first side surface interface component. In some embodiments, the first side surface interface component is removable and replaceable. In some embodiments, the first side surface interface component is constructed from compressible, non-marring material. In some embodiments, the door cradle comprises a generally planar second side surface interface component. In some embodiments, the second side surface interface component is removable and replaceable. In some embodiments, the second side surface interface component is constructed from compressible, non-marring material. In some embodiments, the door cradle comprises a floor surface interface component. In some embodiments, the floor surface interface component is constructed from compressible, non-marring material.

In some embodiments, the system comprises a clamping device located close to a cradle anterior end on a cradle bottom. In some embodiments, the clamping device comprises a spanning bar. In some embodiments, a spanning bar first end comprises a first side clamping member having a threaded first side clamping rod inside a threaded inner cavity. In some embodiments, the first side clamping rod comprises a first side clamping handle. In some embodiments, a spanning bar second end comprises a second side clamping member having a threaded second side clamping rod inside a threaded inner cavity. In some embodiments, the second side clamping rod comprises a second side clamping handle.

In some embodiments, the system comprises a first axle perpendicularly located on the cradle first side comprising a first wheel. In some embodiments, the system comprises a second axle perpendicularly located on the cradle second side comprising a second wheel.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Following is a list of elements corresponding to a particular element referred to herein

100 Door transporting and positioning system
200 Door
210 Door first edge
220 Door strike edge
230 Door top
240 Door bottom
250 Door first surface
260 Door second surface
300 Door cradle
310 Cradle first side
312 Cradle first side interior surface
314 Cradle first side exterior surface
320 Cradle second side
322 Cradle second side interior surface
324 Cradle second side exterior surface
330 Cradle anterior end
340 Cradle posterior end
350 Cradle top
360 Cradle bottom
370 Cradle floor
371 Floor first side
372 Floor second side
373 Floor anterior end
374 Floor posterior end
375 Floor top surface
376 Floor bottom surface
377 Floor middle
378 Floor interior surface
380 Slot
382 Slot open end
390 First side surface interface component
391 First side surface interface component interior interface
395 Second side surface interface component
396 Second side surface interface component interior interface
400 Floor surface interface component
401 Floor surface interface component interior interface
500 Clamping device
502 Strap
510 Spanning bar
512 Spanning bar first end
514 Spanning bar second end
520 First side camping member 530 First side clamping rod
534 First side clamping rod first end
536 First side clamping rod second end
540 First side clamping handle
550 First side clamping interface
551 First side clamping interface guiding aperture
555 Threaded inner cavity
560 Second side clamping member
570 Second side clamping rod
574 Second side clamping rod first end
576 Second side clamping rod second end
580 Second side clamping handle
590 Second side clamping interface
591 Second side clamping interface guiding aperture
600 First axle
602 First axle centerline
610 First wheel
620 Second axle
622 Second axle centerline
630 Second wheel
700 First distance
710 Second distance
720 Size insert
800 Third distance
810 Fourth distance Referring now to FIG. 1-6, the present invention features a door transporting and positioning system (100) for enabling a single user to safely transport or position a door (200) for installation. In some embodiments, the system (100) comprises a door (200) having a door first edge (210), a door strike edge (220), a door top (230), a door bottom (240), a door first surface (250), and a door second surface (260). In some embodiments, the strike edge (220) of the door is located opposite the hinges (which are mounted on the door first edge (210).

In some embodiments, the system (100) comprises a door cradle (300) having a cradle first side (310), a cradle second side (320), an open cradle anterior end (330), an open cradle posterior end (340), a cradle top (350), and a cradle bottom (360). In some embodiments, the cradle bottom (360) comprises a cradle floor (370) disposed thereon having a floor first side (371) perpendicularly disposed on the cradle first side (310), a floor second side (372) perpendicularly disposed on the cradle second side (320), a terminating floor anterior end (373), a terminating floor posterior end (374), a floor top surface (375) and a floor bottom surface (376). In some embodiments, the cradle bottom (380) is the cradle floor (370). In some embodiments, the cradle floor (370) comprises a slot (380) fluidly disposed therein from the floor top surface (375) to the floor bottom surface (376). In some embodiments, a slot open end (382) originates at a floor middle (377) (between the floor first side (371) and the floor second side (372)) of the floor anterior end (373). In some embodiments, the cradle floor (370) comprises a general shape of a "U" in a transverse plane when the floor top surface (375) and the floor bottom surface (376) are parallel to a level plane.

In some embodiments, the door cradle (300) comprises a generally planar first side surface interface component (390) disposed on a cradle first side interior surface (312). In some embodiments, the first side surface interface component (390) traverses the cradle first side (310) and extends out and away from the cradle anterior end (330). In some embodiments, a first side surface interface component interior interface (391) is generally parallel with the cradle first side interior surface (312). In some embodiments, the first side surface interface component (390) is removable and replaceable. In some embodiments, the first side surface interface component (390) is constructed from compressible, non-marring material with respect to a standard finished or unfinished door (200).

In some embodiments, the door cradle (300) comprises a generally planar second side surface interface component (395) disposed on a cradle second side interior surface (322). In some embodiments, the second side surface interface component (395) traverses the cradle second side (320) and extends out and away from the cradle anterior end (330). In some embodiments, a second side surface interface component interior interface (396) is generally parallel with the cradle second side interior surface (322). In some embodiments, the second side surface interface component (395) is removable and replaceable. In some embodiments, the second side surface interface component (395) is constructed from compressible, non-marring material with respect to a standard finished or unfinished door (200).

In some embodiments, the door cradle (300) comprises a floor surface interface component (400) disposed on the floor top surface (375). In some embodiments, the floor surface interface component (400) traverses the cradle floor (370). In some embodiments, a floor surface interface component interior interface (401) is generally parallel with the cradle floor interior surface (378). In some embodiments, the floor surface interface component (400) is constructed from compressible, non-marring material, with respect to a standard finished or unfinished door (200).

In some embodiments, the system comprises a clamping device (500) disposed proximal to the cradle anterior end (330) on the cradle bottom (360) via a plurality of straps (502). In some embodiments, the clamping device (500) comprises a cylindrical linear spanning bar (510) having a spanning bar first end (512) and a spanning bar second end (514).

In some embodiments, the spanning bar first end (512) comprises a first side clamping member (520) affixed thereto. In some embodiments, the first side clamping member (520) comprises a threaded first side clamping rod (530) rotatably disposed though a threaded inner cavity (555) therein. In some embodiments, the first side clamping rod (530) comprises a first side clamping handle (540) operatively disposed perpendicularly on a first side clamping rod first end (534) thereon. In some embodiments, upon rotation of the first side clamping rod (530) via the first side clamping handle (540), a first side clamping interface (550) disposed on a first side clamping rod second end (536) contacts and compresses against a cradle first side exterior surface (314) for clamping the door (200).

In some embodiments, the spanning bar second end (514) comprises a second side clamping member (560) affixed thereto, in some embodiments, the second side clamping member (560) comprises a threaded second side clamping rod (570) rotatably disposed though a threaded inner cavity (555) therein. In some embodiments, the second side clamping rod (570) comprises a second side clamping handle (580) operatively disposed perpendicularly on a second side clamping rod first end (574) thereon. In some embodiments, upon rotation of the second side clamping rod (570) via the second side clamping handle (580), a second side clamping interface (590) disposed on a second side clamping rod second end (576) contacts and compresses against a cradle second side exterior surface (324) for clamping the door (200).

In some embodiments, the first side clamping interface (550) is affixed to the cradle first side exterior surface (314). In some embodiments, the second side clamping interface (590) is affixed to the cradle second side exterior surface (324).

In some embodiments, the first side clamping interface (550) comprises a first side clamping interface guiding aperture (551) disposed therein. In some embodiments, the spanning bar (510) is slidably disposed through the first side clamping interface guiding aperture (551). In some embodiments, the second side clamping interface (590) comprises a second side clamping interface guiding aperture (591) disposed therein. In some embodiments, the spanning bar (510) is slidably disposed through the second side clamping interface guiding aperture (591).

In some embodiments, the system (100) comprises a first axle (600) perpendicularly disposed between the cradle top (350) and the cradle bottom (360) on the cradle first side (310) proximal to the cradle posterior end (340) comprising a first wheel (610) rotatably disposed thereon. In some embodiments, the system (100) comprises a second axle (620) perpendicularly disposed between the cradle top (350) and the cradle bottom (360) on the cradle second side (320) proximal to the cradle posterior end (340) comprising a second wheel (630) rotatably disposed thereon.

In some embodiments, a first distance (700) from a first axle centerline (602) to a farthest tip of the cradle posterior end (340) of the cradle first side (310) is smaller than a radius of the first wheel (610). In some embodiments, a second distance (710) from a second axle centerline (822) to a farthest tip of the cradle posterior end (340) of the cradle second side (320) is smaller than a radius of the second wheel (630).

In some embodiments, in a first released mode, a door cradle (300) is adapted to be slidably inserted over a door strike edge (220). In some embodiments, the floor top surface (375) is adapted to interface with the door strike edge (220). In some embodiments, a third distance (800) comprises a distance between the first side surface interface component interior interface (391) and the second side surface interface component interior interface (396). In some embodiments, a fourth distance (810) comprises a distance between the door first surface (250) and the door second surface (260). In some embodiments, the third distance (800) is greater than the fourth distance (810). In some embodiments, the third distance (800) is no more than 2 inches greater than the fourth distance (810). In some embodiments, the third distance (800) is no more than 1 inch greater than the fourth distance (810). In some embodiments, the third distance (800) is no more than ½ inch greater than the fourth distance (810). In some embodiments, the door cradle (300) is adapted to fit over the door (200) via the floor surface interface component interior interface (401) interfacing with the door strike edge (220), the first side surface interface component interior interface (391) interfacing with the door first surface (250) or the door second surface (260), and the second side surface interface component interior interface (396) interfacing with the door first surface (250) or the door second surface (260).

In some embodiments, in a second clamped mode, the first side clamping handle (540) is rotated to compress the first side clamping interface (550) against a cradle first side (310) thereby compressing the first side surface interface component (390) against the door first surface (250). In some embodiments, the second side clamping handle (580) is rotated to compress the second side clamping interface (590) against a cradle second side (320) thereby compressing the second side surface interface component (395) against the door second surface (260).

In some embodiments, the door (200) can be safely moved and positioned in the system (100).

Figure 1:
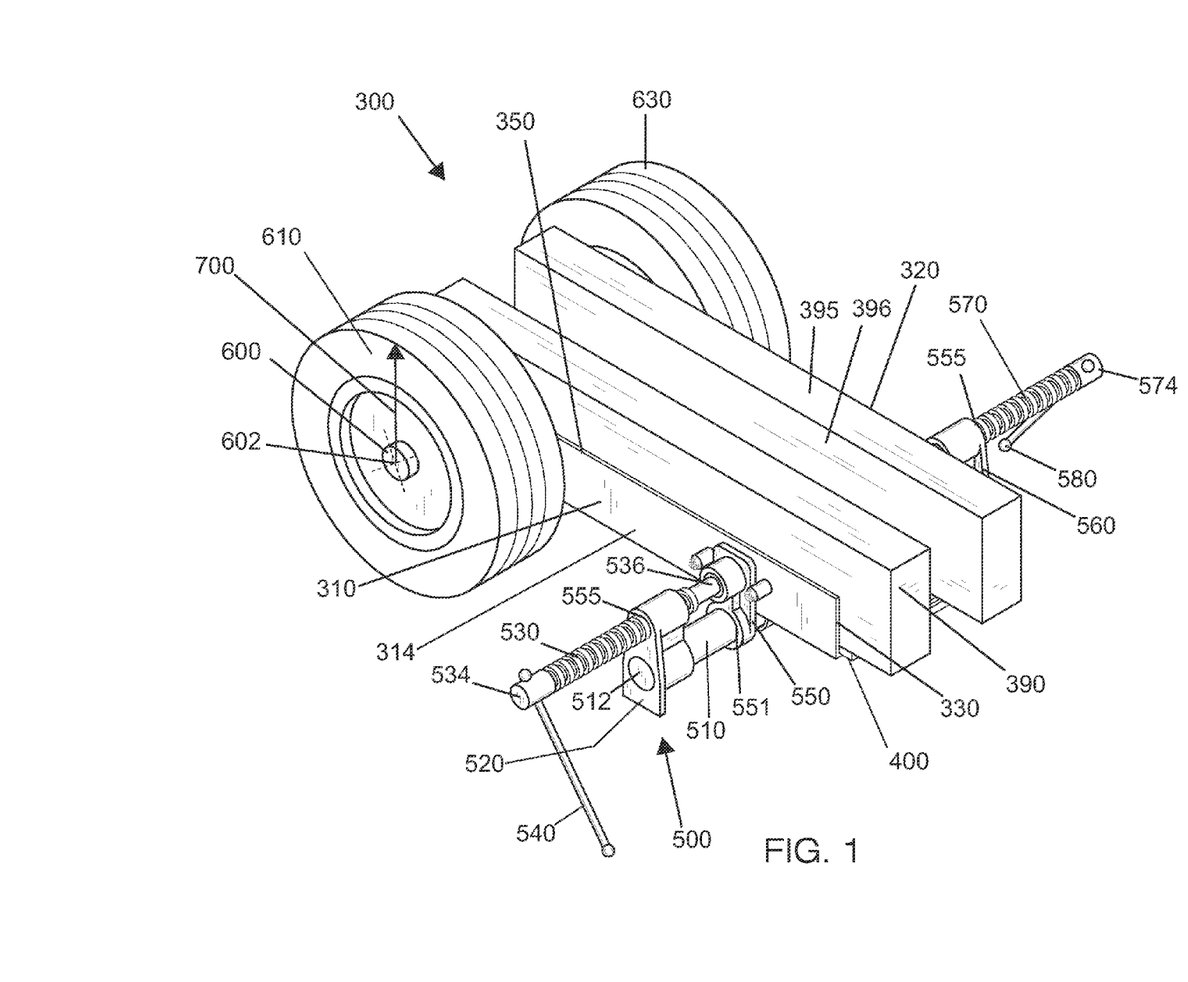
FIG. 1 is a perspective view of the top of the door cradle of the present invention.
Figure 2:
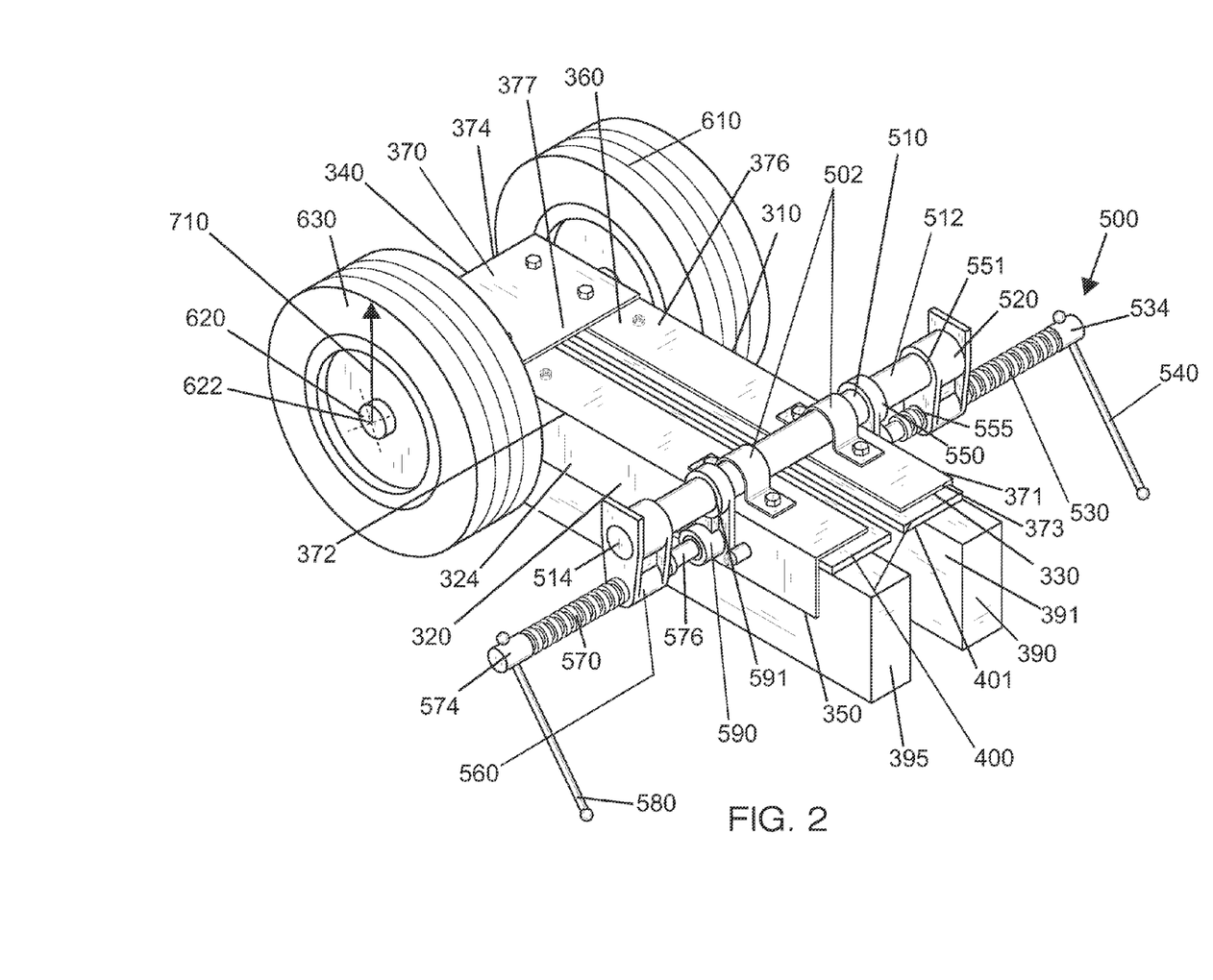
FIG. 2 is a perspective view of the bottom of the door cradle of the present invention.
Figure 3:
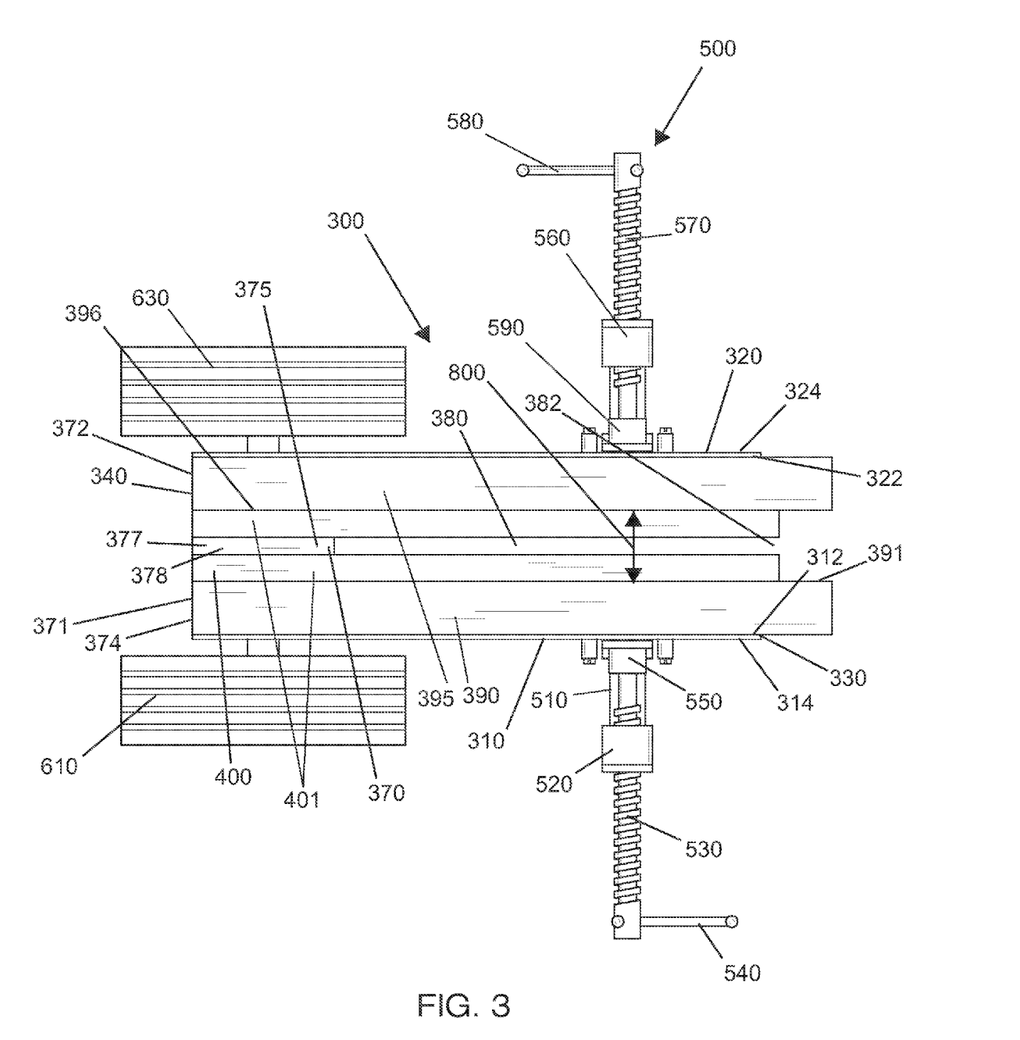
FIG. 3 is a top view of the door cradle of the present invention.
Figure 4:
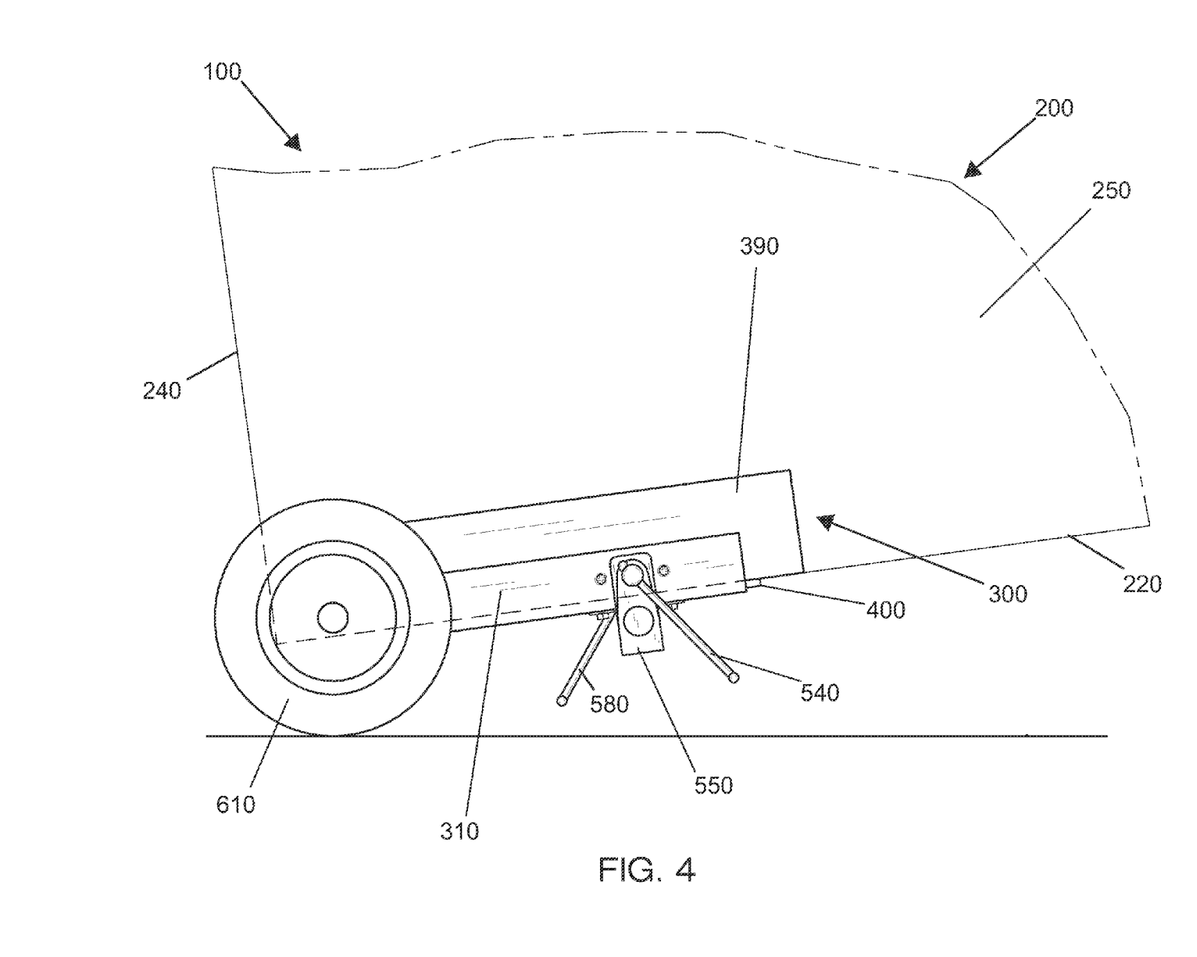
FIG. 4 is a side view of the present invention.
Figure 5:
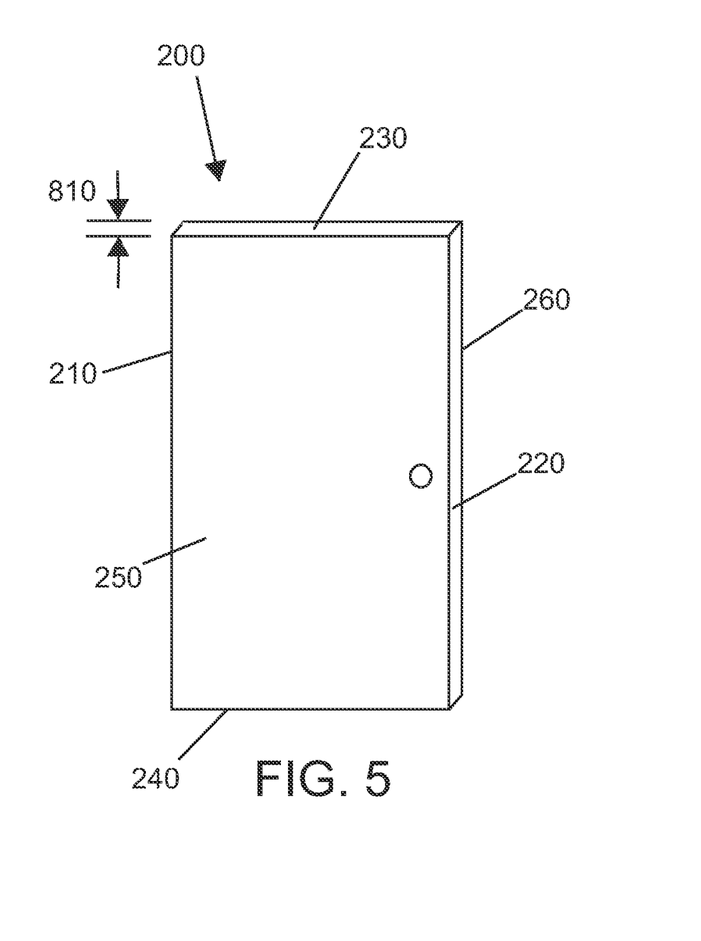
FIG. 5 is a front view of the door of the present invention.
Figure 6:
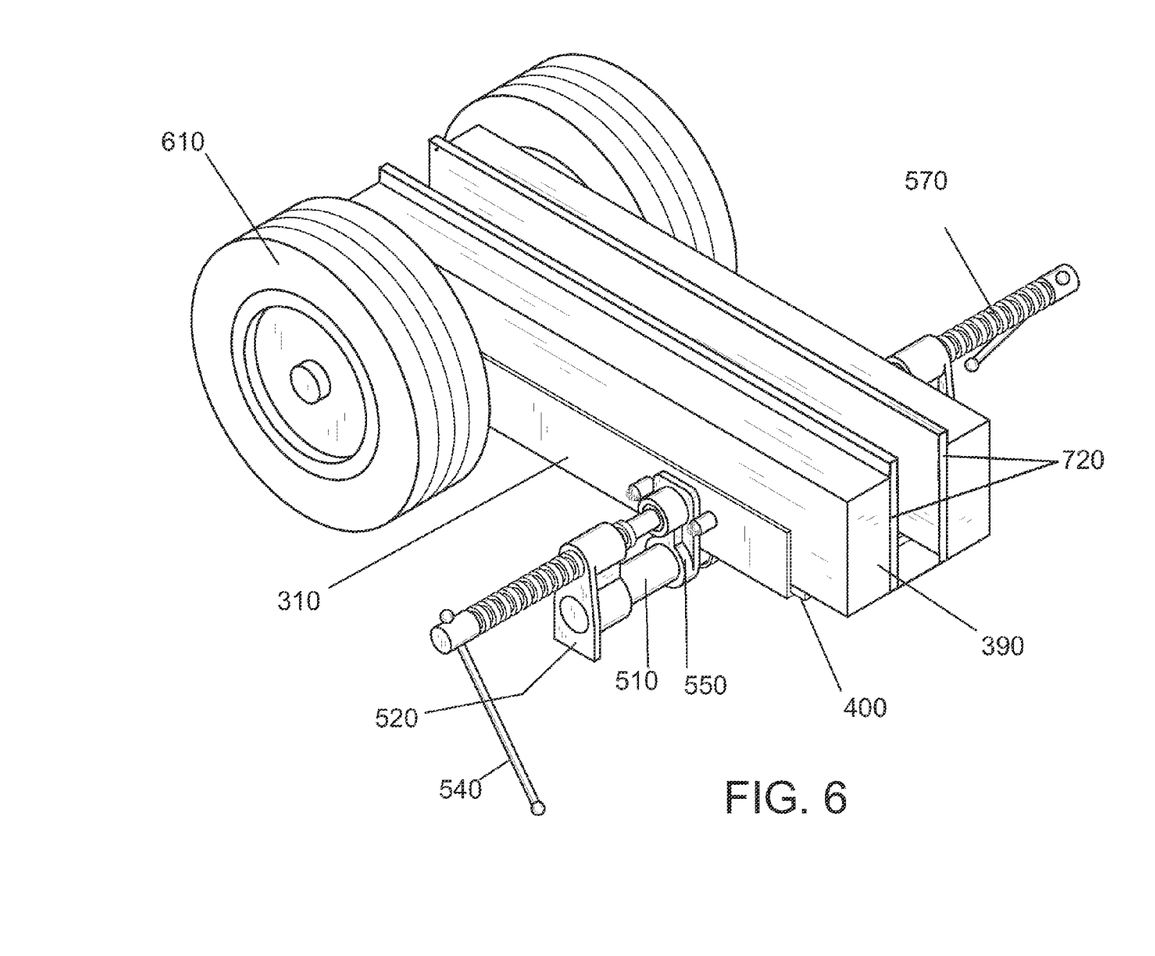
FIG. 6 is a perspective view of the size insert of the present invention.

In some embodiments, a size insert (720) is disposed in the door cradle (300). In some embodiments, the size insert (720) is adapted to be accommodate a "Door transporting and positioning device" door (200) having a specific thickness. In some embodiments, the size insert (720) comprises a cross-section of a "U" in a coronal plane. In some embodiments, the size insert (720) is constructed from compressible, non-marring material. In some embodiments, the size insert (720) traverses the door cradle (300) from the cradle anterior end (330) to the cradle posterior end (340). In some embodiments, the size insert (720) covers the first side surface interface component interior interface (391), the second side surface interface component interior interface (396) and the floor surface interface component interior interface (401).

In some embodiments, the first side surface interface component (390) or the second side surface interface component (395) is constructed from wood. In some embodiments, the first side surface interface component (390) or the second side surface interface component (395) is constructed from plastic. In some embodiments, the first side surface interface component (390) or the second side surface interface component (395) is constructed from metal. In some embodiments, the first side surface interface component (390) or the second side surface interface component (395) is constructed from rubber. In some embodiments, the floor surface interface component (400) is constructed from a carpet. In some embodiments, the floor surface interface component (400) is constructed from a wood. In some embodiments, the floor surface interface component (400) is constructed from a plastic. In some embodiments, the floor surface interface component (400) is constructed from a metal. In some embodiments, the floor surface interface component (400) is constructed from a rubber.

In some embodiments, the clamping device (500) is a pipe clamp. In some embodiments, the clamping device (500) is a bar clamp.

As used herein, the term "about" refers to plus or minus 10% of the referenced number. For example, an embodiment wherein the door cradle is about 10 inches in length includes a door cradle that is between 9 and 11 inches in length.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A door transporting and positioning system (100) for enabling a single user to safely transport or position a door (200) for installation, wherein the system (100) comprises:
   (a) the door (200) having a door first edge (210), a door strike edge (220), a door top (230), a door bottom (240), a door first surface (250), and a door second surface (260);
   (b) a door cradle (300) having a cradle first side (310), a cradle second side (320), an open cradle anterior end (330), an open cradle posterior end (340), a cradle top (350), and a cradle bottom (360), wherein the cradle bottom (360) comprises a cradle floor (370) disposed thereon having a floor first side (371) perpendicularly disposed on the cradle first side (310), a floor second side (372) perpendicularly disposed on the cradle second side (320), a terminating floor anterior end (373), a terminating floor posterior end (374), a floor top surface (375) and a floor bottom surface (376), wherein the cradle floor (370) comprises a slot (380) fluidly disposed therein from the floor top surface (375) to the floor bottom surface (378), wherein an slot open end (382) originates at a floor middle (377) (between the floor first side (371) and the floor second side (372)) of the floor anterior end (373), wherein the cradle floor (370) comprises a general shape of a "U" in a transverse plane when the floor top surface (375) and the floor bottom surface (376) are parallel to a level plane, wherein the door cradle (300) comprises a generally planar first side surface interface component (390) disposed on a cradle first side interior surface (312), wherein the first side surface interface component (390) traverses the cradle first side (310) and extends out and away from the cradle anterior end (330), wherein a first side surface interface component interior interface (391) is generally parallel with the cradle first side interior surface (312), wherein the first side surface interface component (390) is removable and replaceable, wherein the first side surface interface component (390) is constructed from compressible, non-marring material with respect to a finished or unfinished door (200), wherein the door cradle (300) comprises a generally planar second side surface interface component (395) disposed on a cradle second side interior surface (322), wherein the second side surface interface component (395) traverses the cradle second side (320) and extends out and away from the cradle anterior end (330), wherein a second side surface interface component interior interface (396) is generally parallel with the cradle second side interior surface (322), wherein the second side surface interface component (395) is removable and replaceable, wherein the second side surface interface component (395) is constructed from compressible, non-marring material with respect to a finished or unfinished door (200), wherein the door cradle (300) comprises a floor surface interface component (400) disposed on the floor top surface (375), wherein the floor surface interface component (400) traverses the cradle floor (370), wherein a floor surface interface component interior interface (401) is generally parallel with the cradle floor interior surface (378), wherein the floor surface interface component (400) is constructed from compressible, non-marring material, with respect to a finished or unfinished door (200);

(c) a clamping device (500) disposed proximal to the cradle anterior end (330) on the cradle bottom (360) via a plurality of straps (502), wherein the clamping device (500) comprises a cylindrical linear spanning bar (510) having a spanning bar first end (512) and a spanning bar second end (514), wherein the spanning bar first end (512) comprises a first side clamping member (520) affixed thereto, wherein the first side clamping member (520) comprises a threaded first side clamping rod (530) rotatably disposed though a threaded inner cavity (555) therein, wherein the first side clamping rod (530) comprises a first side clamping handle (540) operatively disposed perpendicularly on a first side clamping rod first end (534) thereon, wherein upon rotation of the first side clamping rod (530) via the first side clamping handle (540), a first side clamping interface (550) disposed on a first side clamping rod second end (536) contacts and compresses against a cradle first side exterior surface (314) for clamping the door (200), wherein the spanning bar second end (514) comprises a second side clamping member (560) affixed thereto, wherein the second side clamping member (560) comprises a threaded second side clamping rod (570) rotatably disposed though a threaded inner cavity (555) therein, wherein the second side clamping rod (570) comprises a second side clamping handle (580) operatively disposed perpendicularly on a second side clamping rod first end (574) thereon, wherein upon rotation of the second side clamping rod (570) via the second side clamping handle (580), a second side clamping interface (590) disposed on a second side clamping rod second end (576) contacts and compresses against a cradle second side exterior surface (324) for clamping the door (200), wherein the first side clamping interface (550) is affixed to the cradle first side exterior surface (314), wherein the second side clamping interface (590) is affixed to the cradle second side exterior surface (324), wherein the first side clamping interface (550) comprises a first side clamping interface guiding aperture (551) disposed therein, wherein the spanning bar (510) is slidably disposed through the first side clamping interface guiding aperture (551), wherein the second side clamping interface (590) comprises a second side clamping interface guiding aperture (591) disposed therein, wherein the spanning bar (510) is slidably disposed through the second side clamping interface guiding aperture (591);

(d) a first axle (600) perpendicularly disposed between the cradle top (350) and the cradle bottom (360) on the cradle first side (310) proximal to the cradle posterior end (340) comprising a first wheel (610) rotatably disposed thereon; and (e) a second axle (620) perpendicularly disposed between the cradle top (350) and the cradle bottom (360) on the cradle second side (320) proximal to the cradle posterior end (340) comprising a second wheel (630) rotatably disposed thereon;

wherein a first distance (700) from a first axle centerline (602) to a farthest tip of the cradle posterior end (340) of the cradle first side (310) is smaller than a radius of the first wheel (610), wherein a second distance (710) from a second axle centerline (622) to a farthest tip of the cradle posterior end (340) of the cradle second side (320) is smaller than a radius of the second wheel (630), wherein in a first released mode, the door cradle (300) is adapted to be slidably inserted over the door bottom (240) of the door strike edge (220), wherein the floor top surface (375) is adapted to interface with the door strike edge (220), wherein a third distance (800) comprises a distance between the first side surface interface component interior interface (391) and the second side surface interface component interior interface (396), wherein a fourth distance (810) comprises a distance between the door first surface (250) and the door second surface (260), wherein the third distance (800) is greater than the fourth distance (810), wherein the third distance (800) is no more than 1 inch greater than the fourth distance (810), wherein the door cradle (300) is adapted to fit over the door (200) via the floor surface interface component interior interface (401) interfacing with the door strike edge (220), the first side surface interface component interior interface (391) interfacing with the door first surface (250) or the door second surface (260), and the second side surface interface component interior interface (396) interfacing with the door first surface (250) or the door second surface (260), wherein in a second clamped mode, the first side clamping handle (540) is rotated to the compress the first side clamping interface (550) against the cradle first side (310) thereby compressing the first side surface interface component (390) against the door first surface (250), wherein the second side clamping handle (580) is rotated to compress the second side clamping interface (590) against the cradle second side (320) thereby compressing the second side surface interface component (395) against the door second surface (260), wherein the door (200) can be moved and positioned in the system (100).

2. The system (100) of claim 1, wherein a size insert (720) is disposed in the door cradle (300), wherein the size insert (720) is adapted to accommodate the door (200) having a specific thickness, wherein the size insert (720) comprises a cross-section of a "U" in a coronal plane.

3. The system (100) of claim 1, wherein the first side surface interface component (390) or the second side surface interface component (395) is constructed from wood.

4. The system (100) of claim 1, wherein the floor surface interface component (400) is constructed from a carpet.

5. The system (100) of claim 1, wherein the clamping device (500) is a pipe clamp.

\* \* \* \* \*